United States Patent [19]

Strong

[11] Patent Number: 4,458,908
[45] Date of Patent: Jul. 10, 1984

[54] TANDEM TRICYCLE

[76] Inventor: John R. Strong, 1307 Kirkland Ave., Kirkland, Wash. 98033

[21] Appl. No.: 367,395

[22] Filed: Apr. 12, 1982

[51] Int. Cl.³ .............................................. B62K 5/00
[52] U.S. Cl. ................................... 280/239; 280/7.16; 280/231; 280/273; 280/292
[58] Field of Search ...................... 280/7.16, 231, 239, 280/273, 292

[56] References Cited

U.S. PATENT DOCUMENTS

| | | | |
|---|---|---|---|
| 552,907 | 1/1896 | Jakobson | 280/7.16 |
| 579,982 | 4/1897 | Jakobson | 280/7.16 |
| 598,872 | 2/1898 | Hunt | 280/7.16 |
| 658,406 | 9/1900 | Straub | 280/273 |
| 1,300,343 | 4/1919 | Carswell | 280/7.16 |
| 2,271,255 | 1/1942 | Du Bois | 280/7.16 |
| 3,132,872 | 5/1964 | Pinsly | 280/7.16 |
| 3,680,879 | 8/1972 | Cogliano | 280/7/16 |
| 4,261,592 | 4/1981 | Busseuil | 280/292 |

FOREIGN PATENT DOCUMENTS 840363 7/1949 Fed. Rep. of Germany ...... 280/239

Primary Examiner—Joseph F. Peters, Jr.
Assistant Examiner—Kenneth R. Rice
Attorney, Agent, or Firm—Seed and Berry

[57] ABSTRACT

A tandem tricycle is easily constructed from standard bicycles by removing the front wheel and fork of the rear bicycle, placing an adapter on the frame of the rear bicycle, and mounting the adapter to the rear of the leading bicycle. The adapter allows the rear bicycle to tilt, to articulate, and to bend with respect to the leading bicycle. Each function is independently achieved through suitable assemblies, and the combination allows simultaneous tilting, articulating, and bending. Although described with reference to an adapter suitable for converting standard bicycles to a tandem tricycle, the invention also contemplates the manufacture of an integral tandem bicycle or tricycle having an adapter which allows tilting, articulating, and bending of the trailing section of the tandem relative to the leading section. Multisectioned velocipedes are also contemplated.

32 Claims, 8 Drawing Figures

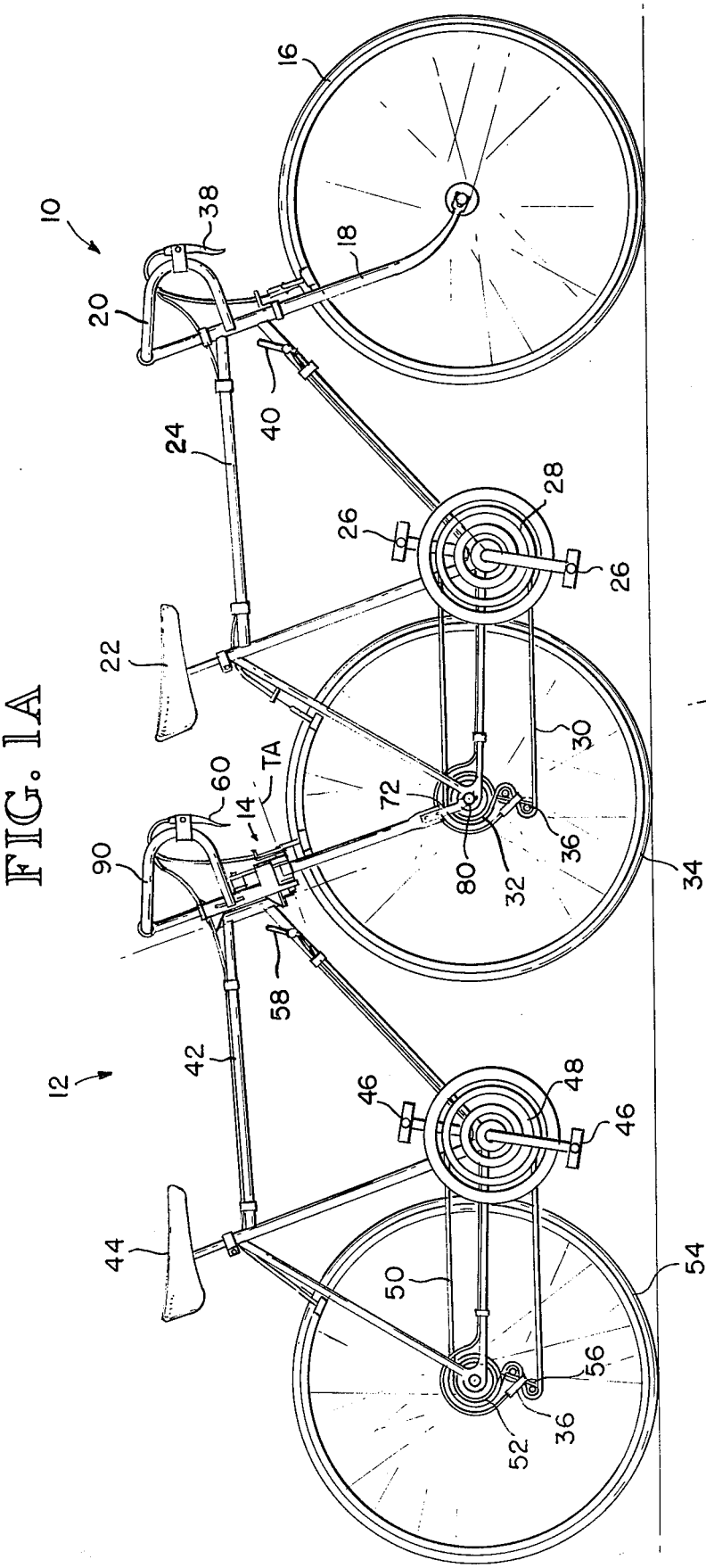
FIG. 1A
FIG. 1B
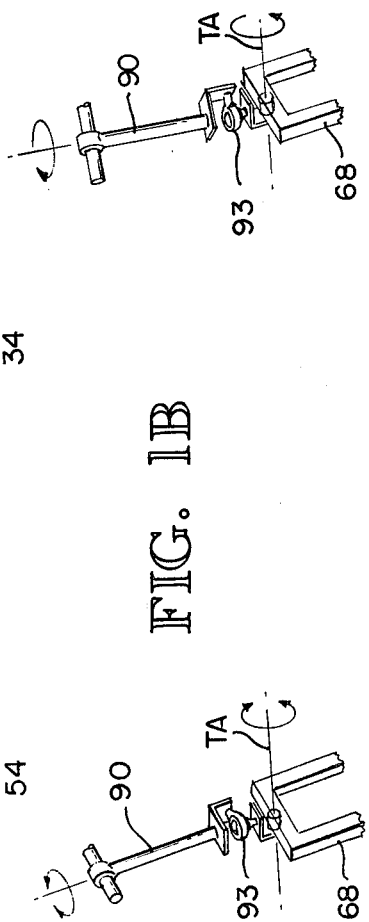
FIG. 1C

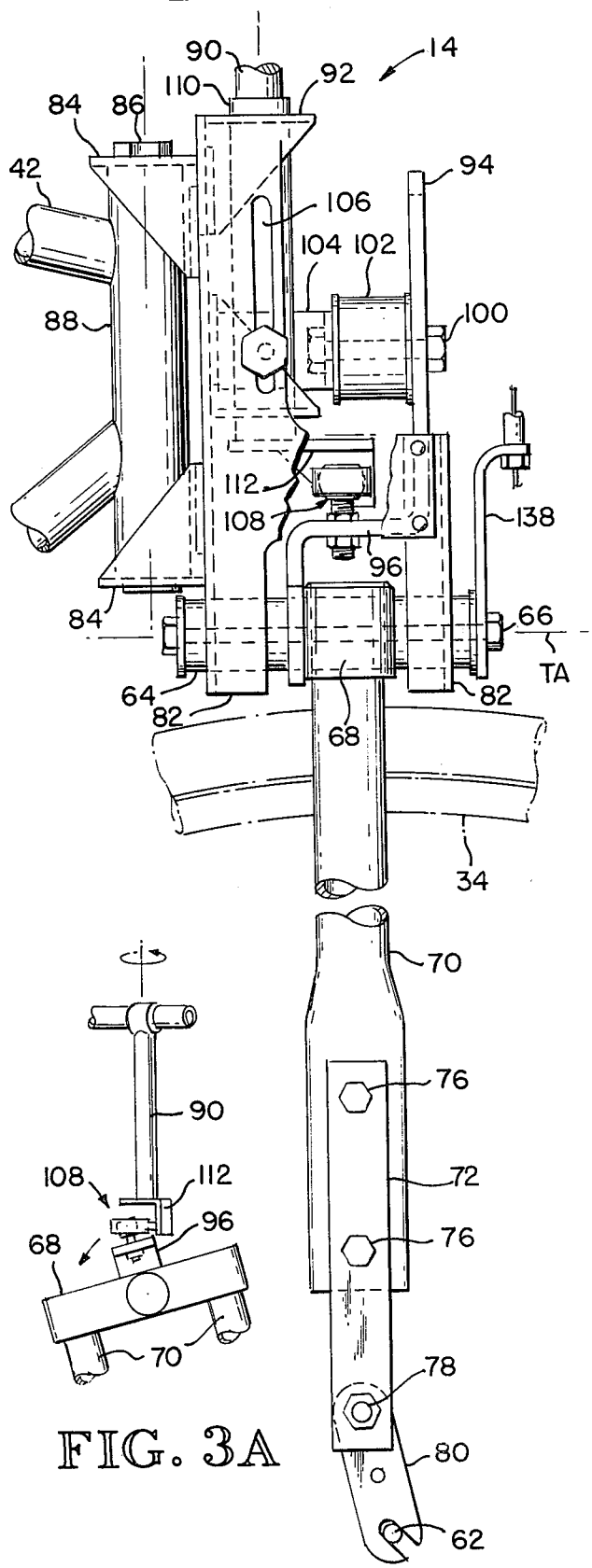
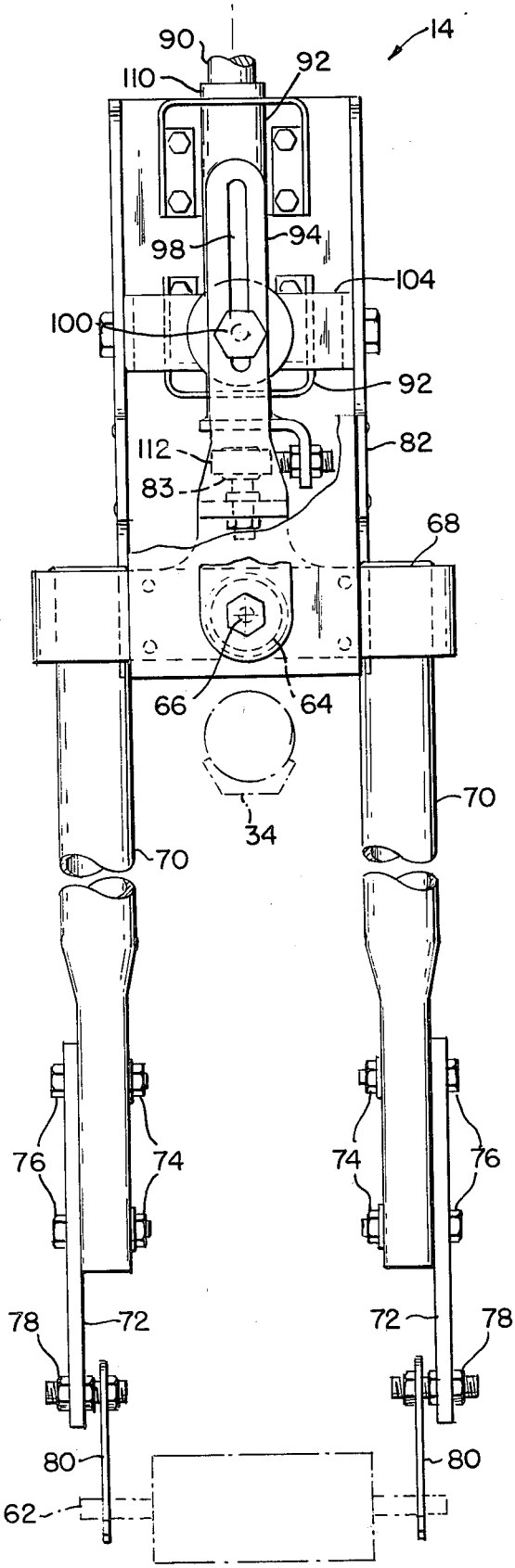

TANDEM TRICYCLE

DESCRIPTION

1. Technical Field

This invention relates to a velocipede having multiple sections or to a tandem tricycle having two sections which are able to tilt, articulate, and bend with respect to each other. Generally, the tandem tricycle is made by converting two ordinary bicycles into a tandem with an adapter which allows the desired tilting, articulating, and bending.

2. Background Art

Tandem bicycles should be capable of articulation and tilting of one section relative to the other. "Articulation," for the purposes of this description, means the ability of the trailing section to swing through an arc in a horizontal plane deviating from the vertical plane of the leading section. That is, when viewed from the front, the trailing section may move either right or left of the plane of the leading section. When articulated, the trailing section defines a plane which intersects the plane of the leading section substantially in a line which is colinear with the longitudinal axis of the head shaft of the rear section. "Tilting" shall mean the ability of the trailing section to swing through an arc deviating from a vertical plane which is defined by the elongated frame of the leading section. That is, if viewed from the front of the tandem tricycle, the tilted trailing section will define a plane which intersects the plane of the leading section in a line which is substantially horizontal and which passes through the tilt hinge. "Bending" shall mean the ability for the tandem tricycle to flex about a generally transverse horizontal axis so that the leading wheel and trailing wheel may oscillate with respect to a fixed point on the adapter, allowing the vehicle to negotiate changes in slope.

Tandem bicycles have been known for many years. The primary disadvantages of tandem bicycles for two-rider travel are that tandems are expensive, are difficult to store, lack maneuverability, and require that each rider pedal at the same speed. Kits are available for coupling two ordinary bicycles together in a side-by-side configuration. Side-by-side linking, however, hampers cornering due to the inability of either bicycle to lean, increases wind resistance due to the increased frontal area of the vehicle, and increases the width in traffic.

U.S. Pat. Nos. 552,907 and 579,982, issued to Jakobson, disclose tandem attachments for bicycles which allow a second bicycle to be rigidly attached to a leading bicycle, without allowing tilting of the rear bicycle with respect to the leading bicycle. Whether converting two bicycles into a tandem or attaching an auxiliary frame to an otherwise ordinary bicycle, the Jakobson inventions fail to recognize the significant advantage gained by having the rear bicycle able to tilt with respect to the leading bicycle.

Similarly, U.S. Pat. Nos. 598,872 and 1,300,343 disclose tandem tricycles which also are unable to tilt. Although the rear bicycle is able to bend and to articulate with respect to the leading bicycle, stability is lost for the second rider because the rear bicycle will not tilt independently from the leading bicycle. Tilting is beneficial when cornering, and is commonly employed when cornering with an ordinary bicycle. Both riders of an ordinary tandem must balance together rather than independently.

U.S. Pat. No. 3,132,872 discloses a tandem kit for a bicycle which converts a regular bicycle into a tandem by rigidly adding a rear frame portion to the leading bicycle after removing the rear wheel. The resulting bicycle functions similarly to the standard tandem, having a coupled drive train with a single chain and single driven hub.

U.S. Pat. No. 3,680,879 discloses a collapsible tandem bicycle which can be made into various tandem or coupled arrangements with interfitting and interchangeable segments.

DISCLOSURE OF INVENTION

This invention uses ordinary bicycles that most people already own, keeping the cost down. The bicycles are easily uncoupled, allowing easy storage. The minimum turning radius is small because the vehicle articulates in the middle. In the preferred embodiment, both riders have their own transmission; thus they may select different gear ratios and even coast while the other rider is pedaling.

This invention is a device that converts two single bicycles into a tandem tricycle and gives improved handling characteristics to the resulting tandem. The device consists of an adapter or special fork for the rear bicycle that fits onto brackets near the rear axle of the front bicycle. The front wheel of the rear bicycle is not used; in essence, the rear bicycle becomes a semi-trailer. The special fork has a unique mechanism in it such that when the handlebars are turned (independent of the fork turning), the tilt angle between the bicycles is changed. This is for stability.

The tricycle articulates about the fork shaft of the special fork, in the normal fork bearings, independently of the rear handlebars turning. The handlebars rotate in the special fork about a steering shaft. Bearings at the end of the fork allow for variations in road slope between the two bicycles.

The preferred embodiments of the unique tilt angle compensating mechanism include a pivot shaft that rotates relative to the rear bicycle in proportion to the angle the steering shaft (handlebars) is rotated. This can be accomplished with levers, belts, friction discs, hydraulics, gears, and other mechanical devices. In one embodiment, bevel gear segments are used, as only a few degrees of travel are used.

The center of gravity of the rear rider is above the axis of the pivot shaft. Thus, deviations from vertical of the rear bicycle cause a moment that must be reacted to by the rear rider's applying a moment to the handlebars. This moment can be eliminated with a torsional spring (or linear springs and levers) on the pivot shaft. The spring may be made of rubber, steel, or other elastic materials. The required spring rate varies with the weight of the rider, although it is not critical. The spring rate should either be adjustable or easily changed by replacing the springs. A 170-pound rider requires a spring rate of about 3,000 inch pounds/radian.

Stability is important for safe bicycle or tandem operation. When a rider leans in a turn on a bicycle, this leaning is automatically compensated for (from a learned reaction occurring early in riding experience) by the rider turning the handlebars in the same direction as the lean. It is therefore desirable to maintain the stability or balance reaction in a tandem. The unique mechanism of this invention provides stability by converting the lean of one rider of the tandem into a torque on the part of the tandem in the same direction, which, when reacted to by a counter-torque, either from springs or by the other rider turning the handlebars, tends to restore the first rider to the upright condition. As an example, if the front rider leans to the right and then automatically steers to the right, the unique stabilizing mechanism of this invention will resist the lean and tend to restore the front rider to the upright position. The rear handlebars will also turn to the right steering direction and the rider will return them to center, again providing a righting moment to the front bicycle. Thus, while they can lean separately, both riders will tend, either through springs or turning of the rear handlebars, or both, to restore the leaning rider to an upright position, unless, of course, both riders lean in unison, as when rounding a curve.

The forward bicycle may be used singly simply by uncoupling the tandem. Locking means on the pivot shaft and adapters at the fork ends allow the rear bicycle to be used with its normal front wheel.

Articulation is achieved by providing an articulation axis between the head shaft of the trailing bicycle and the adapter. Tilting is achieved through a spring-biased mechanism which interconnects the two bicycle frames. The springs provide a reaction force to allow balancing when the rear bicycle tilts with respect to the leading bicycle. Preferably, the degree of tilt is controlled with the handlebars of the rear bicycle. Bending is achieved by placing bearings at the connection of the adapter fork with the rear axle of the leading bicycle, although other embodiments are also envisioned.

In a preferred embodiment, levers are used to achieve the tilting. One lever extends from a steering shaft of the adapter and is driven by the rear bicycle, and another, from a pivot shaft which is driven by the forward bicycle. The levers are joined at a spherical bearing. As the pivot shaft rotates, the spherical bearing swings through a small arc, causing the steering shaft to rotate. The ratio of the rotation angles is inversely proportional to the length of the levers. An elastomeric shear spring, which is attached between the pivot shaft lever and a housing that holds the steering shaft, deflects when the levers swing with respect to one another. The deflection creates a restoring force which tries to keep the levers in their middle positions. The restoring force also counters the instability caused by the rider's center of gravity being above the pivot shaft. The effective spring rate varies with the square of the distance the spring is placed above the pivot shaft.

To accommodate dimensional adjustments between different styles of bicycles, the adapters are adjustable. Also, to accommodate different riders, the neutral position for the spring is adjustable.

BRIEF DESCRIPTION OF THE DRAWINGS

FIG. 1A shows a typical side elevation of a tandem tricycle of this invention.

FIGS. 1B and 1C are schematic operational views of a portion of the invention.

FIG. 2 shows a side elevation of a preferred adapter of this invention.

FIG. 3 shows a front view of the adapter of FIG. 2.

FIG. 3A is another operational schematic.

BEST MODE FOR CARRYING OUT THE INVENTION

Figure 4:
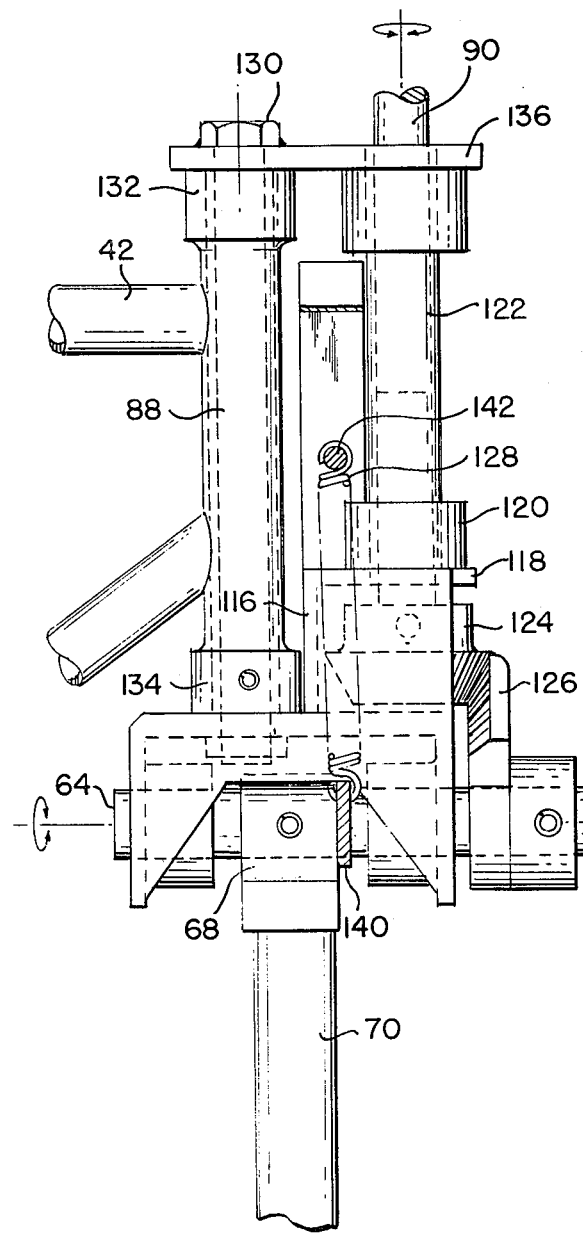
FIG. 4 shows a side elevation of an alternative adapter according to this invention.

Although the concepts of this invention are useful for building velocipedes with multiple tilting, bending, and articulating sections, and integral tandem bicycles or tricycles having an independently articulating, tilting, and bending rear section, the invention is best understood by focusing upon an adapter which allows quick and convenient conversion of two ordinary bicycles into a tandem tricycle while allowing quick and efficient reconversion of the bicycles into separate bicycles. Thus, discussion of the invention will focus, first, on two embodiments of an adapter to convert two bicycles into a tandem tricycle. Focus upon the adapter is not intended to limit the invention.

A novel feature of this invention is the ability for a trailing section to tilt, to bend, and to articulate independently from a leading section. The ability to independently tilt greatly improves enjoyment of tandem tricycle riding by allowing the trailing rider to independently balance himself or herself when cornering. This tilting feature is schematically illustrated in the operational views, FIGS. 1B and 1C, wherein TA is the tilt axis for the trailing section relative to the leading section. This tilt axis TA is also shown in FIGS. 1A and 2.

Although ordinarily used with standard ten-speed bicycles, the tandem tricycle of this invention may be used on any bicycle-type velocipede, such as a lightweight moped or motorcycle. Any combination of drive assemblies for the leading and trailing sections may be used. That is, the leading bicycle may be a moped while the trailing bicycle is an ordinary bicycle. Generally, two ten-speed bicycles of similar design, style, and weight will be coupled together to form the tandem tricycle.

As FIG. 1A shows, a tandem tricycle has a leading section 10 and a trailing section 12 connected together by an adapter 14. The leading section 10 has a front wheel 16 mounted to a standard steering fork 18 and handlebars 20. A rider (not shown), seated on a seat 22 which is mounted on the frame 24 behind the handlebars 20, is able to steer and to pedal the pedals 26 which extend outwardly from either side of the frame 24. A chain 30 meshes with either a large or small drive sprocket 28 of a front sprocket pair and drives a hub 32 of the rear wheel 34 of the leading section 10 when the pedals 26 are turned. A standard derailleur 36 allows for shifting between sprockets (not shown) on the rear hub 32 and between the front drive sprockets 28 to change gears. Bakes 38 are connected to the front wheel 16 and to the common wheel 34 as on an ordinary ten-speed bicycle. Gear shifters 40 of standard construction control the derailleur 36.

Because the trailing section 12 ordinarily is a standard bicycle to which an adapter 14 is attached and from which the front wheel and fork have been removed, this section 12 is analogous in all respects to the leading section 10 just described. That is, the trailing section 12 has a frame 42 to which a seat 44 is mounted so that a rider is able to reach pedals 46 and to turn a drive sprocket 48, thereby driving a chain 50 to turn input hub 52 and rear wheel 54. A derailleur 56 and gear shifters 58 allow selection of the appropriate gear for the rider of the trailing section 12. Brakes 60 are connected to the common wheel 34 and the rear wheel 54 to allow independent braking by the trailing rider.

The adapter 14 is best understood by reference to FIGS. 2 and 3, which include the common wheel 34 and axle 62 in phantom to orient the adapter 14 relative to the individual sections 10 and 12.

In the adapter 14, a pivot shaft 64 with a central brake attachment bolt 66 has a fork 68 rigidly coupled around it. The fork 68 includes separate tines 70 which depend downwardly from the pivot shaft 64 on opposite sides of the common wheel 34. Each tine 70 is connected to a suitable tine adapter 72 with nuts 74 and bolts 76. The tine adapter 72 allows lengthening of the tines to account for varying tire sizes. The lower end of each tine adapter 72 is connected through suitable bearings 78 to axle adapters 80 which connect with the axle 62 of the wheel 34. The bearings 78 allow for bending of the trailing section 12 relative to the leading section 10 in the tandem tricycle by rotating at the connection. One suitable bearing construction may be adapted from that disclosed in U.S. Pat. No. 1,300,343, although other simpler bearing connections are contemplated. Bending is not essential in a tandem tricycle, but is preferred to obtain smooth riding.

The fork tine adapter 72 is disconnected from the axle adapters 80, and the axle adapters are left upon the axle 62 of the common wheel 34 when the rear bicycle is disconnected from the tandem. To interconnect the bicycles to form the tandem tricycle, the adapter 72 is attached to the tines 70 and reconnected to the axle adapters 80.

When using the second bicycle as the trailing section 12 in a tandem tricycle, the tine adapter 72 will usually be mounted on the outside portions of the tines 70 to provide the necessary width for connection with the axle adapters 80 on the common axle 34. When using the second bicycle as a separate bicycle, however, the tine adapters 72, axle adapters 80, and bearings 78 are replaced by adapters rigidly connected to the inside of the tines 70 and connect to the axle on the stored front wheel. Thus, a bicycle can easily and conveniently be converted between an ordinary bicycle and a semi-trailer-type trailing section 12 for a tandem tricycle according to this invention. The tine adapters 72 and axle adapters 80 are commonly used with either the embodiment of FIGS. 2 and 3 or the embodiment of FIGS. 4 and 5.

As shown in FIGS. 2 and 3, the pivot shaft 64 is pivotally connected to a housing 82 with suitable conventional bushings. Separate legs of the housing 82 are longitudinally spaced on either side of the fork 68 for stability. The housing 82 includes rearwardly projecting coupling collars 84 which are rigidly coupled to a fork shaft 86 rotatably mounted within the head tube 88 of the frame 42 of the trailing section 12. Conventional steering fork bearings between the fork shaft 86 and head tube 88 allow the independent articulation of the trailing section 12 with respect to the leading section 10. That is, the head tube 88 can revolve around the fork shaft 86 to achieve articulation. Articulation of the rear section 12 is independent of the turning of the rear handlebars 90. The coupling collars 84 are adjustably positionable on the housing 82 through a plurality of mounting holes to accommodate different dimensions for the head tube 88 on different styles of bicycles. Brackets 92, with suitable internal bushings, rotatably mount a hollow steering shaft 110 in the center of the housing 82. The gooseneck of the handlebars 90, shown schematically in FIG. 2, is functionally locked against the inside of the steering shaft 110 in a conventional manner.

A lever 94 is rigidly connected to the pivot shaft 64 and extends upwardly in a direction opposite from the downwardly depending tines 70 of the fork 68 in a generally stepped shape having a substantially horizontal run section 96 between two riser portions. The upper riser portion of the lever 94 has a generally vertical, longitudinal slot 98 which is capable of receiving the bolt end 100 of a rubber shear spring 102. The spring 102 interconnects the lever 94 to the housing 82, attaching to the housing 82 at its other end with a suitable "C" bracket 104. Preferably, bolts from the bracket 104 fit in slots 106 of the housing 82 to allow adjustment of the distance of the spring 102 above the pivot shaft 64. Preferably, the spring 102 is a circular LORD or METALASTIK anti-vibration mounting spring having a spring rate approximately equal to 100 pounds per inch. Such a spring is available from the Dunlop Palmer Engineering Division of Dunlop Ltd. in Leicester, England.

A ball joint 108 (spherical bearing) is mounted on the horizontal run 96 of the lever 94 and is connected to the steering shaft 110 through a bracket 112. The steering shaft 110 extends substantially vertically through brackets 92 on the housing 82 to receive the gooseneck of the handlebars 90 of the trailing section 12. The ball joint 108 and shear spring 102 provide the combination which is preferred to achieve independent, controlled tilting of the trailing section 12.

In operation, then, when balancing, the leading section 10 tilts independently of the trailing section 12. When the leading section 10 tilts, the lever 94 swings through a small arc and stretches the spring 102. Movement of the lever 94 causes the ball of ball joint 108 to swing through a small arc and to displace the bracket 112. The displacement of the bracket 112 causes the steering shaft 110 to rotate about its axis in the bushings of the brackets 92 and to turn the handlebars 90. When the rider of the trailing section straightens the handlebars 90, the bracket 112 attempts to return to its original position with respect to the housing 82, and the trailing section tries to align itself with the position of the leading section. This movement also alleviates the shear load on the spring 102.

Because the center of gravity of the trailing rider is above the axis of the pivot shaft 64, tilting develops a moment which must be countered. The necessary countering force is automatically obtained by the spring 102 or manually by the handlebars, which center balances the relative positions of the steering shaft 110 and lever 94. The required spring rate varies with the weight of the rider, so the spring 102 should be adjustably positionable above the pivot shaft 64 to provide the desired spring rate for different riders. The slots 98 and 106 allow for this adjustment. The spring rate varies with the square of the distance that the spring is above the pivot shaft 64. Typically, a 170-pound rider will require a spring rate of about 3,000 inch pounds/radian to counter the moment created by tilting.

Figure 5:
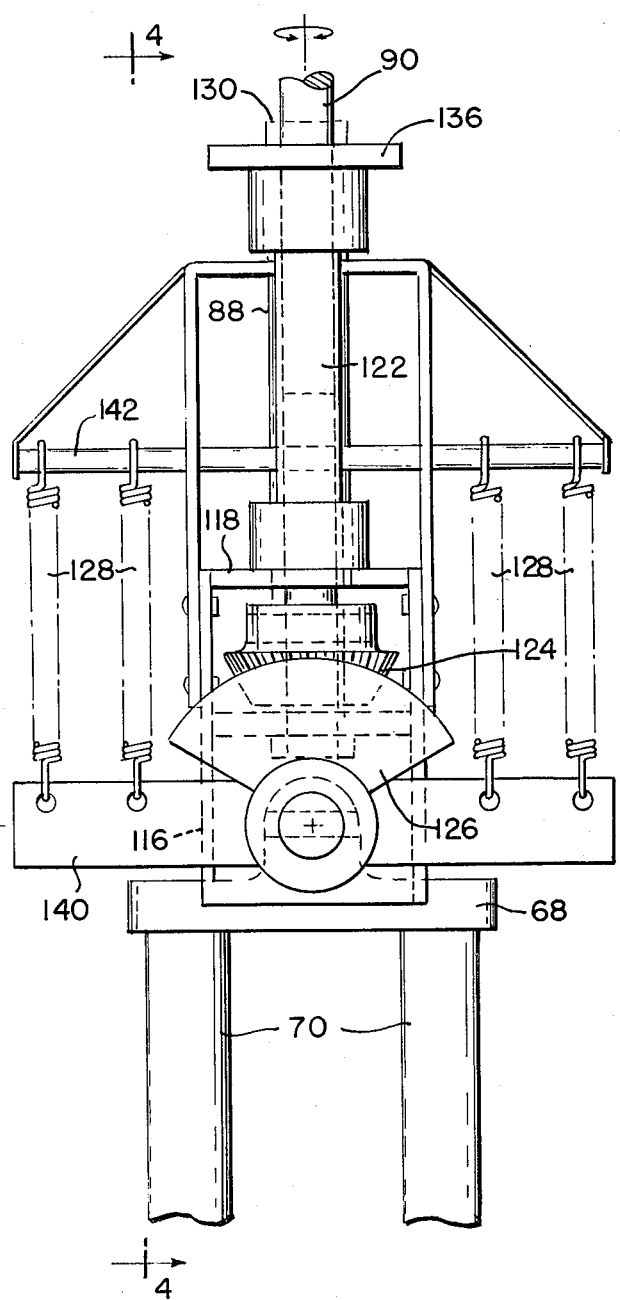
FIG. 5 shows a front view of the adapter of FIG. 4.

An alternative adapter 14a is best shown in FIGS. 4 and 5. This embodiment has a pivot shaft 64 to which a fork 68 with downwardly depending tines 70 is attached. The pivot shaft 64 is rotatably mounted in a housing 116 which includes a generally L-shaped step 118 and coupling 120 to rotatably hold a steering shaft 122 in front of the head tube 88 of the frame 42 of the trailing section 12. The gooseneck of the handlebars 90 of the trailing section 12 frictionally lock within the steering shaft 122 and are used to turn the steering shaft 122 and, in turn, an arcuate, bevel gear segment 124 through a small arc. This gear segment 124 engages a second arcuate gear segment 126, which is rigidly pinned to the pivot shaft 64. When the handlebars 90 are turned to turn the segment 124, then, the trailing section 12 tilts or returns from tilting with respect to the leading section 10 in the same manner as the lever embodiment. Suitable coil springs 128 are attached between the fork 68 and the frame 42 of the trailing section 12 (through a plate 140 on the pivot shaft 64 and a beam 142 on the housing 116) to provide a reaction force to counter the moment created by tilting the trailing section 12 with respect to the leading section 10. The degree of tilt achieved is directly related to the amount the handlebars 90 are turned.

In this alternate embodiment, a fork shaft 130 extends through the head tube 88 of the rear frame 42 and is attached to the head tube 88 with suitable couplings 132 and 134. Bearings within the head tube 88 allow articulation of the fork shaft in the same manner that bearings allow an ordinary steering fork to turn.

The steering shaft 122 is rotatably supported at its upper end by a top bushing 136.

With the intermeshing arcuate gear segments 124 and 126, this alternate adapter 14a achieves the desired tilting which promotes cornering stability within the tandem tricycle.

Attachment of the adapter 14a with the rear axle of the leading section is accomplished in the same way as the connection of the preferred adapter 14.

The two embodiments for adapters 14 and 14a are useful to convert ordinary bicycles into tandem tricycles while allowing the bicycle sections 10 and 12 to be disconnected and to be used independently and individually. The adapters 14 and 14a allow the trailing section of the tandem tricycle to tilt, bend, and articulate with respect to the leading section when used in tandem. When converted, each bicycle has an independent transmission and drive means so that each rider is able to select the appropriate gear for his or her riding comfort. Each adapter 14 or 14a allows the rear rider to counter the moment created when one of the bicycles tilts and achieves greater stability in cornering through tilting. When used as an ordinary bicycle, the ball joint 108 or gear segments 124 and 126 are disabled to prevent undesired tilting and to allow conventional steering of the front fork.

The concept embodied in the adapters 14 or 14a of this invention may easily be incorporated into an integrally constructed tandem bicycle or tricycle. That is, the adapter could be made a permanent part of a single frame to allow tilting, bending, and articulating of the rear section relative to the forward section, while not allowing disconnection of the sections. Furthermore, multiple sections could be connected, with each section being able to tilt, bend, and articulate with respect to the sections to which it is attached.

The mechanism of this invention allows the simultaneous tilting, bending, and articulating which is desirable to achieve optimal efficiency, comfort, convenience, and enjoyment when tandem riding.

A brake cable reaction bracket 138 (shown only in FIG. 2) may be used to guide the brake cable of the trailing section 12 as it clamps the rubber brake shoes (not shown) over the common wheel 34. This brake cable reaction bracket 138 is especially important if the trailing section 12 is to be used with a regular front wheel and is intended to be ridden independently.

Although described with reference to an adapter 14 or 14a, the invention should not be limited to the specific embodiments shown and described. The invention resides in the novel feature of allowing independent tilting, articulating, and, in the preferred embodiment, bending of the trailing section of a tandem tricycle with respect to the leading section. In its most general terms, the invention resides in recognizing the benefits of allowing tilting of the trailing section and in the provision of means to accommodate the tilting. Therefore, the invention should not be limited to the specific embodiments disclosed unless limitation is necessary in light of the appended claims and the prior art.

I claim:

1. An adapter to convert a leading bicycle and a rear bicycle into a tandem tricycle, comprising:
   (a) a pivot shaft;
   (b) a steering shaft coupled to the pivot shaft and capable of receiving the handlebar gooseneck of the rear bicycle;
   (c) a two-tined fork downwardly depending from the pivot shaft and being capable of receiving the rear wheel of the leading bicycle between the tines of the fork;
   (d) adapters to connect each tine of the fork to the rear of the leading bicycle; and
   (e) a coupling between the steering shaft and the pivot shaft to allow the rear bicycle to tilt with respect to the leading bicycle and to provide a reaction force to counter the moment created by tilting the rear bicycle.

2. The adapter of claim 1, further comprising a connector between the steering shaft and a head tube of the rear bicycle to allow articulation of the rear bicycle relative to the leading bicycle.

3. The adapter of claim 2 wherein the coupling and connector are capable of acting simultaneously so that the rear bicycle may simultaneously tilt and articulate with respect to the leading bicycle.

4. The adapter of claim 3 wherein the tilt achieved is a function of the distance that the handlebars of the rear bicycle are turned and wherein the steering shaft is coupled to the handlebars of the rear bicycle.

5. The adapter of claim 1 wherein the coupling includes a spring which interconnects between the steering shaft and fork to provide the reaction force.

6. The adapter of claim 5 wherein the spring is a shear spring.

7. The adapter of claim 1 wherein the coupling further includes a bearing which is interconnected between a first lever on the steering shaft and a second lever on the pivot shaft.

8. The adapter of claim 7 wherein the second lever has a first substantially vertical riser, a substantially horizontal run extending from the top of the first riser, and a second substantially vertical riser.

9. The adapter of claim 8 wherein the bearing is positioned on the run of the second lever.

10. The adapter of claim 7 wherein the bearing is a ball joint.

11. The adapter of claim 1 wherein the coupling includes a pair of intermeshing, arcuate gear segments, one segment attached to the steering shaft and the other attached to the pivot shaft.

12. The adapter of claim 1 in combination with a velocipede comprising:

(a) a leading bicycle;
(b) a trailing bicycle having a front wheel and fork removed; and
(c) said adapter mounted on said leading bicycle and said trailing bicycle.

13. An adapter to convert a leading bicycle and a rear bicycle into a tandem tricycle capable of tilting and articulating, comprising:
(a) a pivot shaft;
(b) a steering shaft coupled to the pivot shaft, capable of attachment to the head tube of the rear bicycle and capable of receiving the handlebar gooseneck of the rear bicycle;
(c) a two-tined fork downwardly depending from the pivot shaft and being capable of receiving the rear wheel of the leading bicycle between the tines of the fork;
(d) adapters to connect each tine of the fork to the rear of the leading bicycle;
(e) a coupling between the steering shaft and the fork to allow the rear bicycle to tilt with respect to the leading bicycle and to provide a reaction force to counter the moment created by tilting the rear bicycle, including a spring which interconnects between a housing for the steering shaft and the fork to provide the reaction force; and
(f) a bearing connector between the steering shaft and the head tube to allow articulating of the rear bicycle with respect to the leading bicycle.

14. The adapter of claim 13 wherein the coupling includes a ball joint interconnecting the steering shaft and pivot shaft.

15. The adapter of claim 14 wherein the spring is a shear spring.

16. The adapter of claim 13 in combination with a velocipede comprising:
(a) a leading bicycle;
(b) a trailing bicycle having a front wheel and fork removed; and
(c) said adapter mounted on said leading bicycle and said trailing bicycle.

17. An adapter for converting a leading bicycle and a rear bicycle into a tandem tricycle, capable of tilting, articulating, and bending, comprising:
(a) a pivot shaft;
(b) a housing attached to the pivot shaft, capable of attachment to the head tube of the rear bicycle, and including at least one slot extending substantially longitudinally to a steering shaft axis;
(c) a steering shaft attached to the housing, coupled to the pivot shaft, and capable of receiving the handlebar gooseneck of the trailing bicycle;
(d) a two-tined fork downwardly depending from the pivot shaft and being capable of receiving the rear wheel of the leading bicycle between the tines of the fork;
(e) adapters to connect each tine of the fork to the rear of the leading bicycle to accommodate front-to-rear bending of the rear bicycle with respect to the leading bicycle;
(f) a coupling between the steering shaft and the pivot shaft to allow the rear bicycle to tilt with respect to the leading bicycle and to provide a reaction force to counter the moment created by tilting the rear bicycle, including a slotted lever projecting upwardly from the fork subtantially parallel to the axis of the steering shaft, a spring interconnected between the housing and lever in the slots, wherein the spring is capable of sliding in the slot of the housing and in the slot of the lever to adjust the spring rate, and a bearing connected between the steering shaft and the fork to allow tilting of the rear bicycle with respect to the leading bicycle; and
(g) a connector between the steering shaft and the head tube of the rear bicycle to allow articulation of the rear bicycle relative to the leading bicycle.

18. The adapter of claim 17 wherein the lever includes a first riser, a run connected to the top of the first riser and a second riser connected to the run and extending substantially parallel to the longitudinal axis of the steering shaft so that a slot in the second riser extends substantially parallel to the slot of the housing and wherein the bearing is connected to the run of the lever.

19. The adapter of claim 17 in combination with a velocipede comprising:
(a) a leading bicycle;
(b) a trailing bicycle having a front wheel and fork removed; and
(c) said adapter mounted on said leading bicycle and said trailing bicycle.

20. A velocipede for tandem riding, comprising:
(a) an elongated frame, including pivot means on the frame to allow tilting about the generally longitudinal axis of the frame of a rear portion of the frame behind the pivot with respect to a front portion of the frame ahead of the pivot;
(b) drive means mounted on the frame;
(c) two seats mounted on the frame, one seat positioned on the front portion and the other seat on the rear portion of the frame;
(d) steering means attached to the frame and usable from the front seat;
(e) a plurality of wheels rotatably mounted on the frame substantially in one plane, the front wheel connected with the steering means to allow steering of the velocipede; and
(f) control means associated with the pivot means and rear portion of the frame to control the tilt of the rear portion with respect to the front portion, including steering means rotatably mounted on the rear portion and coupled to said forward portion for manually providing a counterforce to tilting of one portion relative to the other portion.

21. The velocipede of claim 20, further including means to allow the rear portion to articulate with respect to the front portion.

22. The velocipede of claim 21, further including means to allow the rear portion to bend with respect to the front portion.

23. The velocipede of claim 20 wherein three wheels are placed in spaced relationship along the frame, and wherein at least one wheel is mounted on the front portion of the frame and one wheel is mounted on the rear portion of the frame.

24. The velocipede of claim 20 wherein the drive means includes two independent drive assemblies, one being mounted on the front portion of the frame and usable by a rider on the front seat and the other being mounted on the rear portion of the frame and usable by a rider on the rear seat.

25. The velocipede of claim 24 wherein the separate drive assemblies include separate gearing.

26. The velocipede of claim 24 wherein each drive assembly includes:

(a) at least one drive sprocket rotatably mounted to the frame;
(b) pedals operatively associated with the sprocket to allow turning of the sprocket by a rider;
(c) an endless chain engaging the sprocket; and
(d) a hub incorporated into a wheel, engaging the chain and capable of revolving when the sprocket is turned.

27. The velocipede of claim 26 wherein each drive assembly further includes a derailleur associated with each sprocket and hub to provide gearing.

28. The velocipede of claim 20 wherein the control means includes at least one spring to allow controlled tilting by providing the counterforce to tilting.

29. The tandem velocipede of claim 20, said control means including spring means interconnected between the two frame portions to automatically provide a counterforce to tilting of one portion relative to the other, the counterforce tending to bias the portions into alignment.

30. A tricycle for tandem riding, comprising:
(a) an elongated frame, including a pivot midway along the frame to allow simultaneous tilting and articulating of a rear portion of the frame behind the pivot with respect to a front portion of the frame ahead of the pivot;
(b) two seats mounted on the frame, one seat positioned on the front portion and the other seat on the rear portion of the frame;
(c) three wheels rotatably mounted on the frame and spaced along the frame in substantially a single plane, at least one wheel being positioned on the front portion and at least one wheel positioned on the rear portion, and wherein the front wheel of the frame is movable to allow steering of the tricycle;
(d) steering means associated with the front wheel and operable from the front seat, mounted on the frame to allow steering by a rider on the front seat;
(e) a separate drive assembly for each of the front and rear portions of the frame, each drive assembly being operable by a rider on a respective seat; and
(f) control means associated with the pivot and the rear portion of the frame to control the tilt of the rear portion with respect to the front portion of the frame, including steering means rotatably mounted on the rear portion and coupled to said forward portion for providing a counterforce to tilting of one portion relative to the other portion.

31. The tricycle of claim 30 wherein the tricycle also includes means to allow bending of the front and rear portions with respect to each other.

32. The tricycle of claim 30 wherein the control means includes at least one spring to provide the counterforce to counter the moment created by tilting the rear bicycle.

* * * * *